United States Patent [19]

Troin et al.

[11] Patent Number: 5,572,485
[45] Date of Patent: Nov. 5, 1996

[54] UNDERWATER ACOUSTIC TRANSMISSION METHOD AND EQUIPMENT TO IMPROVE THE INTELLIGIBILITY OF SUCH TRANSMISSIONS

[75] Inventors: Georges Troin, Mouans-Sartoux; Claude Cazaoulou, Nice, both of France

[73] Assignee: Safare-Crouzet, Nice, France

[21] Appl. No.: 266,605

[22] Filed: Jun. 28, 1994

[30] Foreign Application Priority Data

Jul. 6, 1993 [FR] France ................... 93 08267

[51] Int. Cl.⁶ .................................. H04B 11/00
[52] U.S. Cl. ........................... 367/134; 367/133
[58] Field of Search ....................... 367/133, 134

[56] References Cited

U.S. PATENT DOCUMENTS

| | | | |
|---|---|---|---|
| 3,860,760 | 1/1974 | Rittenbach | 179/15.55 T |
| 3,867,715 | 2/1975 | Geil | 367/133 |
| 4,200,923 | 4/1980 | Theis | 367/123 |
| 4,236,043 | 11/1980 | Bromley | 179/1.5 H |
| 4,276,624 | 6/1981 | Fisher et al. | 367/134 |
| 4,562,559 | 12/1984 | Sharpe et al. | 367/82 |
| 5,136,613 | 8/1992 | Dumpstre, III | 375/1 |

FOREIGN PATENT DOCUMENTS 2 341 234  2/1977  France .

Primary Examiner—J. Woodrow Eldred
Attorney, Agent, or Firm—Lowe, Price, LeBlanc & Becker

[57] ABSTRACT

A method for underwater, acoustic transmission, characterized in that at the transmitting side, the signal to be transmitted first is sampled, digitized and stored and then un-sampled and un-digitized at a frequency less than the sampling frequency and is thus transmitted in analogue form, and in that at the receiving side the signal is correspondingly sampled, digitized and stored at the said un-sampling and un-digitizing frequency and then is re-read at the said sampling frequency.

21 Claims, 2 Drawing Sheets

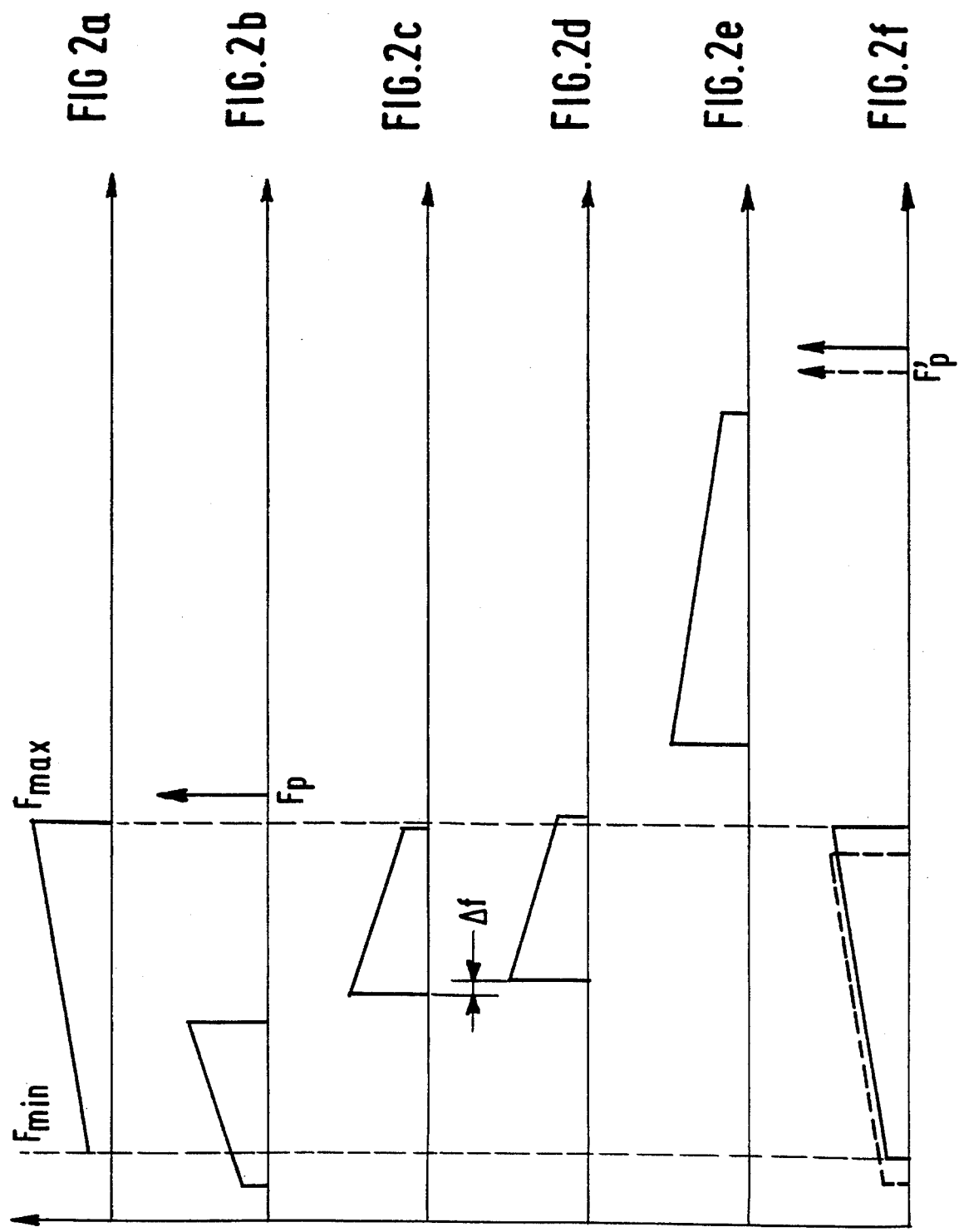

UNDERWATER ACOUSTIC TRANSMISSION METHOD AND EQUIPMENT TO IMPROVE THE INTELLIGIBILITY OF SUCH TRANSMISSIONS

The present invention concerns a method for underwater acoustic transmissions and equipment to improve the intelligibility of such transmissions.

Acoustic transmission means are used for underwater communication for instance between a surface ship and a submarine or a diver.

Unfortunately the intelligibility of such transmissions is quickly degraded when the propagation medium generates multiple paths on account of signal reflection from various obstacles such as the bottom or the surface, thereby producing echoes, or when the transmitter and the receiver move so as to generate a finite radial component, whereby a doppler frequency shift occurs.

However these two effects, namely echoes and frequency shift are naturally compensated by the human brain provided they be limited in magnitude. In fact the human ear tolerates echoes or time stretching when less than 50 ms.

The object of the present invention is to provide a method and equipment applicable in underwater, acoustic transmission and allowing to constrain the echo and doppler effects at less than the tolerance threshold of the human ear.

For that purpose the first object of the invention is an underwater, acoustic transmission method characterized in that at the transmitter side, the signal to be transmitted is previously sampled, digitized and stored, then un-sampled and un-digitized at a frequency lower than the sampling frequency and thus is transmitted in analogue form, and in that at the receiving side, the signal is correspondingly sampled, digitized and stored at the above un-sampling and un-digitizing frequency and then is re-read at the above sampling frequency.

The method of the invention results in time-stretching the transmitted signal and an inverse compression of the received signal. It was found that this stretching at transmission and compression at receiving will substantially decrease echoing and will significantly improve the intelligibility of the transmitted signals. This may be construed as the time stretching at transmission, whereby the energy spectrum falls within a narrow frequency band, increasing the signal-to-noise ratio within said band.

Moreover the method allowing to record messages both at the transmitting and the receiving sides makes it possible on one hand to check the quality of the message to be transmitted before there is any transmission and on the other hand to listen repeatedly to the received message. This repeated listening further contributes to improving the intelligibility by the operator's ear's progressive self-adaptation whereby to some extent the signal part of the message can be extracted from the noise and interference.

The achieved security in transmitted message quality furthermore and indirectly allows improving transmitter and receiver inobtrusiveness which is especially desired in some underwater, acoustic transmissions.

In a particular embodiment mode of the invention, when past its un-digitization, the transmitted signal is frequency-translated into a band compatible with the transmitter, for instance by carrier modulation and by transmitting in a single sideband.

Similarly in another particular embodiment mode of the invention, prior to its sampling and digitization, the received signal is frequency-translated into a band compatible with the storage means, for instance by carrier modulation, a single sideband being generated which then is sampled and digitized.

In yet another embodiment mode of the invention, the re-read signal modulates a carrier and the resulting sideband then forms the reconstituted signal.

In the last case, the carrier frequency shall be adjustable in order to correct for the doppler frequency-translation.

Such a modulation and filtering procedure applied both at the transmitting and the receiving sides allows on one hand to carry out the invention with any conventional transmission equipment without being required to modify the passband or the dynamic characteristics, and on the other hand allows free access by the operator when re-listening in order to correct for the doppler effect.

Another object of the invention is equipment with which to improve the intelligibility of the underwater, acoustic transmissions and which is characterized in that it comprises, at the transmitting side, means stretching by a given factor the signal to be transmitted and, at the receiving side, means compressing the time of the received signal by a reciprocal factor.

In a particular embodiment mode, the time-stretching and the time-compressing means comprise sampling and digitizing means, a digital memory, and means for un-digitizing and un-sampling.

Moreover the equipment of the invention may include frequency-translating means for the signal to be transmitted and for the received signal in turn comprising means to modulate a carrier and a filter able to eliminate one of the modulation sidebands.

Preferably the carrier frequency shall be adjustable to allow operator correction of doppler-caused frequency translations.

A non-limiting and illustrative embodiment mode of the invention is described below in relation to the attached drawings.

FIGS. 2a–2f show the consecutive translations of the frequency spectrum undergone by the signal at transmission, receiving and re-reading.

Figure 1:
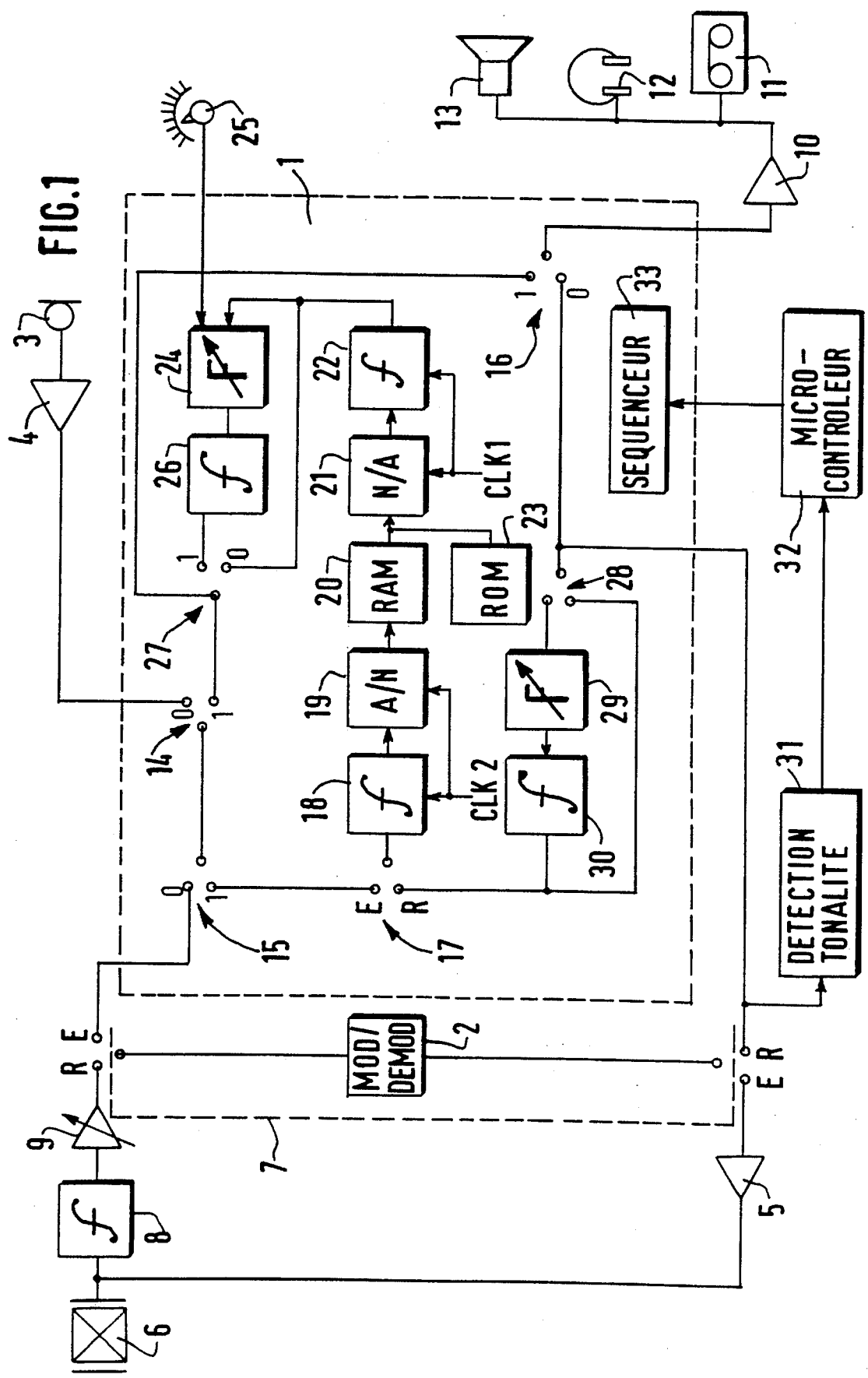
FIG. 1 is a block diagram of the equipment of the invention.

Equipment 1 of the invention is designed to be used with known underwater, acoustic transceiver systems such as telephones.

Such a system comprises a modem 2 allowing at the transmission side to modulate a frequency carrier illustratively between 3.6 and 45 kHz by means of an incoming signal from a microphone 3 and amplified by an amplifier 4. The frequency spectrum of the microphone signal is in the conventional 500–3,000 Hz band. The modulated signal is amplified again in an amplifier 5 and then transmitted by a transducer 6.

At the receiving side, the double-pole, double-throw switch 7 is actuated in order to first filter the received signal in a filter 8 before amplifying it in a variable-gain amplifier 9 and then in a power amplifier 10, this signal lastly being fed to a tape recorder 11, a headset 12 or loudspeaker 13.

At its input the equipment 1 comprises two two-position switches 14 and 15 and at its output a two-position switch 16 which, when they are in the 0 position, make the equipment transparent. In this configuration the amplified output of the microphone 3 is directly fed to the modulation input of the modem 2 whereas its demodulation output is directly amplified and fed to the input of the apparatus 11, 12, 13.

On the other hand when at least one of the switches 15 and 16 or the switch 17 is in the position 1, the equipment will be operational.

When the switch 14 is in position 0 and the switch 15 in the position 1, the output signal of the amplifier 4 is fed to the recording input E of a switch 17 of which the output is fed to the input of a low-pass analogue filter 18. The cutoff frequency of the filter 18 is a function of $CLK_2$, which is the sampling frequency in an analogue-digital converter 19 of which the input receives the output of filter 18. The cutoff frequency of the filter 18 is less than half the sampling frequency in the converter 19 in order to obey Shannon's theorem, Thereupon the output from the converter 19 is stored in a RAM memory 20. Illustratively, if the converter 19 samples at 32 kHz at 12 bits and if compression is carried out to 4 bits, the input signal of the memory 20 will be 128 kbauds, and accordingly a 4 Mbit memory may store 30 seconds of speech.

The output of the RAM 20 is fed to the input of a digital-analogue converter 21 which is followed by a low-pass filter 22 of which the cutoff frequency is controlled by the un-digitizing frequency $CLK_1$ in the converter 21. This un-digitizing frequency may equal the digitizing frequency in the converter 19, namely 32 kHz in the above example, or it may be a sub-multiple of this frequency, for instance 16, 8 and 4 kHz resp. defining a stretch ratio of 2, 4 and 8 in the digitizing frequency in the converter 19 to the un-digitizing frequency in the converter 21.

A non-volatile ROM memory 23 is connected in parallel with the RAM 20. Pre-defined messages which are currently being used are recorded by a conventional-memory programmer in this memory 23.

These messages can be selected upon operator request, this operator thereby being unburdened from creating such messages. This is especially significant when transmitting cyclic messages illustratively within security procedures. Heretofore the operator was forced for instance to transmit every three minutes a message several seconds long for every one of the day's 24 hours, but henceforth this task can be entrusted to the equipment which by means of the sequencer discussed below generates the same procedure in totally automated manner without danger of forgetfulness.

The output of filter 22 is fed to the input of a modulator 24. The carrier frequency $F_p$ modulated in modulator 24 may be selected from a plurality of values as a function of the stretch factor N. It can also be adjusted using a knob 25 directly accessed by the operator.

Therefore the frequency spectrum of the output signal from the modulator 24 comprises two side-bands centered on the frequency $F_p$. This output signal is fed to the input of a low-pass filter 26 allowing the elimination of the upper side-band.

The assembly consisting of the modulator 24 and the filter 26 may be short-circuited by placing the switch 27 in the position 0. When in position 1, this switch 27 also allows connecting the output of filter 26 to the input 1 of the switch 14 and, through the output 0 of the switch 15, to feed said output to the transmission input E of the modem 2.

Lastly the output of the switch 27 is connected to the input 1 of the switch 16.

The receiver output R of the modem 2 is connected through the switch 28 to the input of a modulator 29 of which the output is fed to the input of a filter 30. In the modulator 29, the received signal modulates a carrier frequency $F_{p1}$ selected as a function of the stretch factor of the received signal. Next the filter 30 allows eliminating the upper side-band of the frequency spectrum.

The stretch factor is coded at the beginning of the received message and is detected in a tone detector 31 which sends it to a micro-controller 32. The micro-controller in turn controls a sequencer 33 which automates equipment operation in suitable manner.

The switch 28 allows shorting the filter 30 and modulator 29. Otherwise the output of the filter 30 is fed to the receiving input R of the switch 17.

Before being transmitted, a message will be stored in memory 20. For that purpose the switch 14 is in position 0, the switch 15 in position 1 and the switch 17 in position E. The message is voiced into the microphone 3 and then is digitized in the converter 19 and stored in memory 20.

When un-digitizing this message in the converter 21 at the same frequency as that of its digitization, the operator, by moving the switch 27 in the position 0 and the switch 16 in position 1, may listen to the message in order to check it out before it will be transmitted.

When the operator wishes to send the message, he selects the stretch function as a function of the operating conditions. Where called for, the un-digitized signal is frequency-translated in the modulator 24 and the filter 26, and then is transmitted through the switches 27 (position 1), 14 (position 1) and 15 (position 0).

When being received and if so called for, the signal is frequency-translated in the modulator 29 and filter 30 and, with the switch 17 being in the receive position, this signal is sampled and digitized in the converter 19 at the frequency at which it was un-digitized in the transmitter converter 21.

This signal is stored in this form in the RAM 20. It may be re-read by un-digitizing it in the converter 21 at the frequency at which it was sampled in the transmitter converter 19.

The Table below illustrates the operation when the stretch factor N is resp. 1, 2, 4, 8. All data in this Table are in Hz except the sampling and un-sampling frequencies which are in kHz.

|  | N | 1 | 2 |  | 4 | 8 |
|---|---|---|---|---|---|---|
| TRANSMITTING | BAND BEING READ | 500–3000 | 250–1500 |  | 125–750 | 62,5–375 |
|  | $F_p$ | 0 | 0 | 3200 | 1600 | 800 |
|  | TRANSMITTED BAND | 500–3000 | 250–1500 (500–1500) | 1700–2950 | 850–1475 | 425–737,5 (500–737,5) |
| RECEIVING | $F_{p1}$ | 6400 | 3200 | 0 | 0 | 0 |
|  | RECEIVED BAND | 3400–5900 | 1700–2700 | 1700–2950 | 850–1495 | 500–737,5 |
|  | SAMPLING | 32 KHz | 16 KHz |  | 8 KHz | 4 KHz |
| RE-READING | UN-SAMPLING | 32 KHz | 32 KHz |  | 32 KHz | 32 KHz |
|  | BAND BEING READ | 3400–5900 | 3400–5400 | 3400–5900 | 3400–5900 | 4000–5900 |
|  | $F_p$ | 6400 ± 100 | 6400 ± 200 |  | 6400 ± 400 | 6400 ± 800 |
|  | LOUD-SPEAKER | 500–3000 | 1000–3000 | 500–3000 | 500–3000 | 500–2400 |

The case for N=2 is subdivided into two sub-sets depending on the carrier frequency of the modem 2 forcing or not a reduced transmission band:

When this carrier frequency is less than 5 kHz, the passband is lowered from 500–3,000 to 500–2,150 Hz.

If in this case the same transmission modulation is kept, the 250–1,500 Hz spectrum becoming 1700–2,950 Hz, much of the information is suppressed by the telephone filters. Accordingly two sub-sets are provided when N=2. The selection of the particular sub-set is controlled by the micro-controller, ie the same drive which selects the filter bandwidth as a function of the carrier frequency.

Be it borne in mind that the use of stretched transmission (compressed spectrum) allows higher data transmission when the telephone operates in the reduced band mode. Illustratively when N=4, all of the original spectrum (500–3,000 Hz) can be transmitted through a reduced channel of 500–2,150 Hz without losing the information within the higher frequencies (2,150 to 3,000 Hz) which would be lost in normal transmission (N=1).

During the storage preceding the transmission, the sampling in the converter 19 takes place always at 32 kHz. The un-sampling at the transmitting side in the converter 21 takes place at 32, 16, 8 or 4 kHz depending on the stretch factor being resp. 1, 2, 4 or 8. Consequently the output signal of the filter 22 evinces the frequency band, ie the band being read, which is shown in the second row of the table.

Where called for, this signal is subsequently frequency-translated in order to make it compatible with the transmitter of which the bandpass is in the conventional 500 to 3,000 Hz range. Thus the signal is not frequency-translated when N=1 or for the first sub-set of N=2. In this sub-set, a slight amount of information will be lost because the read signal was in the 250–1,500 Hz band while only the 500–1,500 Hz portion of this band shall be transmitted.

In the other subset of N=2, and when N=4 or 8, the read signal is frequency-translated in the modulator 24 and the filter 26 with carrier frequencies resp. of 3,200; 1,600 and 800 Hz. In these three cases, only the lower side-band will be preserved. Be it noted that when N=8, again a very slight portion of the information will be lost.

Accordingly the fourth row of the table shows the frequency band wherein is located the transmitted signal.

At the receiving side, the signal will not be frequency-translated when the mode is in the second sub-set of N=2 or when N=4 or 8. On the other hand, it will be effectively translated in the modulator 29 and the filter 30 when N=1 and in the mode of the first sub-set of N=2, the modulated frequency resp. being 6,400 and 3,200 Hz in order to make the signal compatible with the sampling means. Again only the lower side-band is retained.

Therefore the sixth row of the Table shows the frequency band of the signal at the input of filter 18.

This signal then is sampled at 32, 16, 8 or 4 kHz when N is resp. 1, 2, 4 and 8. The signal so sampled and digitized is stored in RAM 20.

The signal is retrieved from the memory 20 and always un-sampled at 32 kHz for re-reading.

Therefore the ninth row of the Table shows the frequency band of the signal from the filter 22. This frequency band is always 3,400–5,900 Hz except for the first sub-set of N=2 and when N=8, or wherein again the slight loss of information is observed.

In order to move the signal back into the audible frequency range of 500–3,000 Hz, it will be re-translated in the modulator 24 wherein the modulated frequency is 6,400 Hz and in the filter 26 wherein the upper side-band is eliminated.

The last row of the Table shows the frequency bands containing the input signal, for instance of the loudspeaker.

The second-last row of the Table shows the frequency $F_p$ modulated in the modulator 24 which can be adjusted by ±100 Hz, ±200 Hz, ±400 Hz and ±800 Hz for N=1, 2, 4 and 8 resp. The operator adjusts this frequency by means of the knob 25 which allows canceling the doppler effect from any relative radial speed other than null between transmitter and receiver.

FIGS. 2 illustrate the second sub-set for N=2.

FIG. 2a shows the frequency spectrum of the signal from the microphone 3, namely 500–3,000 Hz, $F_{min}$–$F_{max}$.

FIG. 2b shows the spectrum of the output signal from the filter 22 following time stretching. Next the signal is frequency-translated around the frequency $F_p$ in the modulator 24, only the lower sideband shown in FIG. 2c being retained in the filter 26. The spectrum so generated remains entirely compatible with the capacity of the transmission channel being used ($F_{min}$–$F_{max}$).

FIG. 2d shows the spectrum of the signal received by the far receiver and shifted by an amount Δf because of the doppler effect. The time compression in the converter 19 results in the re-stretched spectrum of FIG. 2e. Lastly the signal is frequency-re-translated in the modulator 24 and the filter 26 around the adjustable frequency $F'_p$. FIG. 2f shows the resulting nominal spectrum $F'_p$ in dashed lines, and, in solid lines, the spectrum following operator-adjustment of $F'_p$. The latter spectrum is identical with the initial one of FIG. 2, namely 500–3,000 Hz.

We claim:

1. A method of underwater, acoustic transmission, characterized in that before being transmitted, a signal to be transmitted is sampled, digitized and stored and then un-sampled and un-digitized at a frequency less than the sampling frequency and thus is transmitted in analogue form, and in that at the receiving side said signal is correspondingly sampled, digitized and stored at the said un-sampling and un-digitizing frequency and then is re-read at the said sampling frequency in which, following its un-digitization, the transmitted signal is frequency-translated into a transmitter-compatible band.

2. Method defined in claim 1, wherein the frequency-translation is carried out by modulating a carrier and by transmitting in single sideband.

3. Method defined in claim 1, wherein, previously to its sampling and digitization, the received signal is frequency-translated into a band compatible with the storage means.

4. Method defined in claim 3, wherein the translation is carried out by carrier modulation, only one of sidebands resulting from modulation being thereafter sampled and digitized.

5. Method defined in claim 1, wherein the reread signal serves to modulate a carrier, one of the resulting sidebands forming the reconstituted signal.

6. Method defined in claim 5, wherein the carrier frequency is adjustable.

7. Equipment to improve the intelligibility of underwater, acoustic transmissions, having a transmitting channel means and a receiving channel means characterized in that it comprises in said transmitting channel means to time-stretch by a predetermined factor a signal to be transmitted and, in said receiving channel, means to time-compress by a reciprocal of said predetermined factor the received signal in which the means to time stretch and the means to time-compress comprise sampling and digitizing means, a digital memory, and un-digitizing and un-sampling means.

8. Equipment defined in claim 7, further comprising means to frequency-translate the signal to be transmitted.

9. Equipment defined in claim 7, further comprising means 29, 30 to frequency-translate the received signal.

10. Equipment defined in claim 8, wherein the frequency-translating means comprise carrier-modulating means 24, 29 and a filter 26, 30 able to eliminate one of the sidebands generated by the modulation.

11. Equipment defined in claim 10, comprising means to adjust the carrier frequency.

12. A method of underwater acoustic transmission of information comprising:

a. sampling at a frequency $f_o$, digitizing and storing a signal to be transmitted to produce a stored signal, b. retrieving said stored signal at a sample frequency $f_o/N$, where N may be selectively set by an operator, and converting retrieved samples to a time-stretched analog signal for transmission.

13. The method of claim 12 in which N is selected by an operator based on underwater environmental conditions.

14. The method of claim 12 in which an indication of the value of N is transmitted with said time-stretched analog signal.

15. A method of underwater acoustic reception of information comprising:

a. sampling an acoustic signal to be received at a frequency $f_o/N$, and digitizing and storing samples of said acoustic signal to produce a stored received signal, b. retrieving said stored received signal at a sample frequency $f_o$ and converting retrieved samples to a time-compressed analog signal to be heard by an operator.

16. The method of claim 15 further comprising:

a. receiving a signal indicating the value of N and setting the sampling frequency to $f_o/N$.

17. A transmitter for underwater acoustic transmission of information comprising:

a. means for sampling at a frequency $f_o$, digitizing and storing a signal to be transmitted to produce a stored signal, b. means for retrieving said stored signal at a sample frequency $f_o/N$, where N may be selectively set by an operator, and for converting retrieved samples to a time-stretched analog signal for transmission.

18. The transmitter of claim 17 including means for setting N based on underwater environmental conditions.

19. The transmitter of claim 18 including means for transmitting indication of the value of N with said time-stretched analog signal.

20. A receiver for underwater acoustic reception of information comprising:

a. means for sampling an acoustic signal to be received at a frequency $f_o/N$, and digitizing and storing samples of said acoustic signal to produce a stored received signal, b. means for retrieving said stored received signal at a sample frequency $f_o$ and converting retrieved samples into a time-compressed analog signal to be heard by an operator.

21. The method of claim 20 further comprising:

a. means for receiving a signal indicating the value of N and setting the sampling frequency to $f_o/N$.

* * * * *